United States Patent
Chang et al.

(10) Patent No.: US 9,208,124 B2
(45) Date of Patent: Dec. 8, 2015

(54) RESET OF PROCESSING CORE IN MULTI-CORE PROCESSING SYSTEM

(75) Inventors: Steven S. Chang, San Jose, CA (US); Anshuman Thakur, Beaverton, OR (US); Ramacharan Sundararaman, Hillsboro, OR (US); Ramon Matas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 13/993,663

(22) PCT Filed: Dec. 29, 2011

(86) PCT No.: PCT/US2011/067874
§ 371 (c)(1),
(2), (4) Date: Jun. 12, 2013

(87) PCT Pub. No.: WO2013/101082
PCT Pub. Date: Jul. 4, 2013

(65) Prior Publication Data
US 2013/0339663 A1    Dec. 19, 2013

(51) Int. Cl.
| | | |
|---|---|---|
| *G06F 11/00* | (2006.01) | |
| *G06F 15/80* | (2006.01) | |
| *G06F 13/14* | (2006.01) | |
| *G06F 1/24* | (2006.01) | |
| *G06F 11/07* | (2006.01) | |

(52) U.S. Cl.
CPC *G06F 15/80* (2013.01); *G06F 1/24* (2013.01); *G06F 11/0709* (2013.01); *G06F 11/0724* (2013.01); *G06F 11/0757* (2013.01); *G06F 13/14* (2013.01)

(58) Field of Classification Search
CPC . G06F 15/80; G06F 11/0757; G06F 11/0793; G06F 1/24; G06F 11/1415
USPC ................................................ 714/23; 712/29
See application file for complete search history.

(56) References Cited

U.S. PATENT DOCUMENTS

| | | | |
|---|---|---|---|
| 7,206,966 B2 | 4/2007 | Barr et al. | |
| 7,287,180 B1 * | 10/2007 | Chen et al. | 714/4.3 |
| 8,037,367 B1 * | 10/2011 | Havemose | 714/55 |
| 2004/0141461 A1 * | 7/2004 | Zimmer et al. | 370/216 |
| 2005/0138249 A1 | 6/2005 | Galbraith et al. | |
| 2010/0325257 A1 | 12/2010 | Goel et al. | |

FOREIGN PATENT DOCUMENTS

KR    10-2008-0016226    2/2008

OTHER PUBLICATIONS

PCT International Search Report for PCT Counterpart Application No. PCT/US2011/067874, 3 pgs., (Sep. 3, 2012).

(Continued)

*Primary Examiner* — Yair Leibovich
(74) *Attorney, Agent, or Firm* — Nicholson De Vos Webster & Elliott LLP

(57) ABSTRACT

This disclosure is directed to performing a controlled reset of one or more cores while maintaining operation of at least one other core in a multi-core processor. An initialization core may include reset logic that may detect a problematic core or core that is unresponsive or otherwise not operating properly. The initialization core may generate a packet that enables communication with the problematic core. The initialization core may send a reset packet to the problematic core to instruct the problematic core to perform a reset.

17 Claims, 11 Drawing Sheets

(56) References Cited

OTHER PUBLICATIONS

PCT Written Opinion of the International Searching Authority for PCT Counterpart Application No. PCT/US2011/067874, 4 pgs., (Sep. 3, 2012).

PCT Notification concerning Transmittal of International Preliminary Report on Patentability (Chapter I of the Patent Cooperation Treaty) for PCT Counterpart Application No. PCT/US2011/067874, 6 pgs., (Jul. 10, 2014).

* cited by examiner

RESET OF PROCESSING CORE IN MULTI-CORE PROCESSING SYSTEM

CROSS-REFERENCE TO RELATED APPLICATION

This patent application is a U.S. National Phase Application under 35 U.S.C. §371 of International Application No. PCT/US2011/067874, filed Dec. 29, 2011, entitled RESET OF PROCESSING CORE IN MULTI-CORE PROCESSING SYSTEM.

TECHNICAL FIELD

This disclosure relates generally to the field of microprocessors. In particular, this disclosure relates to a reset mechanism for resetting a processing core while operating at least one other processing core of a multi-core processing unit.

BACKGROUND ART

Until recently, computing devices typically included a single processing unit for each socket available on the computing device's main circuit board. More recently, the single processing unit has been improved to include multiple cores, which enable the processor to execute instructions in parallel using the various cores. An ability to include additional processors or cores on a chip becomes more readily available as the footprint of the cores continues to decrease through advancements in manufacturing. The inclusion of many cores on a chip, termed "system on a chip" or "SOC", where the SOC is accessible to the computing device through a socket, may present some new challenges to both hardware and software architects. One challenge is that the additional cores should be accessible by the socket with minimized communication paths that link the cores, thereby saving valuable space on the chip for additional cores or other necessary components. These challenges are further complicated when the availability of the cores may change during an operational life of the SOC.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to performing a controlled reset of one or more cores while maintaining operation of at least one other core in a multi-core processor. The multi-core processor may include many cores, which may be central processing units (CPUs), graphical processing units (GPUs), general processing graphical processing units (GPGPUs), other processing logic, or a combination thereof. The various cores may be in communication with each other and/or an initialization core via an interconnect. The interconnect may be arranged as a mesh interconnect, a shared interconnect, a peer-to-peer (P2P) interconnect, or a ring interconnect.

In accordance with at least some embodiments, an initialization core may include reset logic that may detect a problematic core or core that is unresponsive or otherwise not operating properly. The initialization core may then monitor activities of the problematic core to detect whether other cores are sending requests to the core or waiting for data from the problematic core. The initialization core may broadcast a message using packets to communicate to other cores to stop requests from being sent to the problematic core and/or drop current requests to the problematic core. To perform the reset (and possibly a subsequent unreset), the initialization core may generate a packet that enables communication with the problematic core. The initialization core may send a reset packet to the problematic core to instruct the problematic core to perform a reset. In some embodiments, the reset packet may include a reset command to power-off, turn off, or otherwise terminate operation in the problematic core. In some instances, the initialization core may then transmit an unreset packet to the problematic core to instruct the problematic core to perform an unreset and power-on the core. In some embodiments, the problematic core may resume operation automatically without receipt of the unreset packet. When the problematic core returns to normal operation (and is no longer problematic), then the initialization core may notify the other cores that the previously problematic core is now operational and able to receive requests from the other cores.

The techniques, apparatuses, and systems described herein may be implemented in a number of ways. Example implementations are provided below with reference to the following figures.

Illustrative Environment

Figure 1:
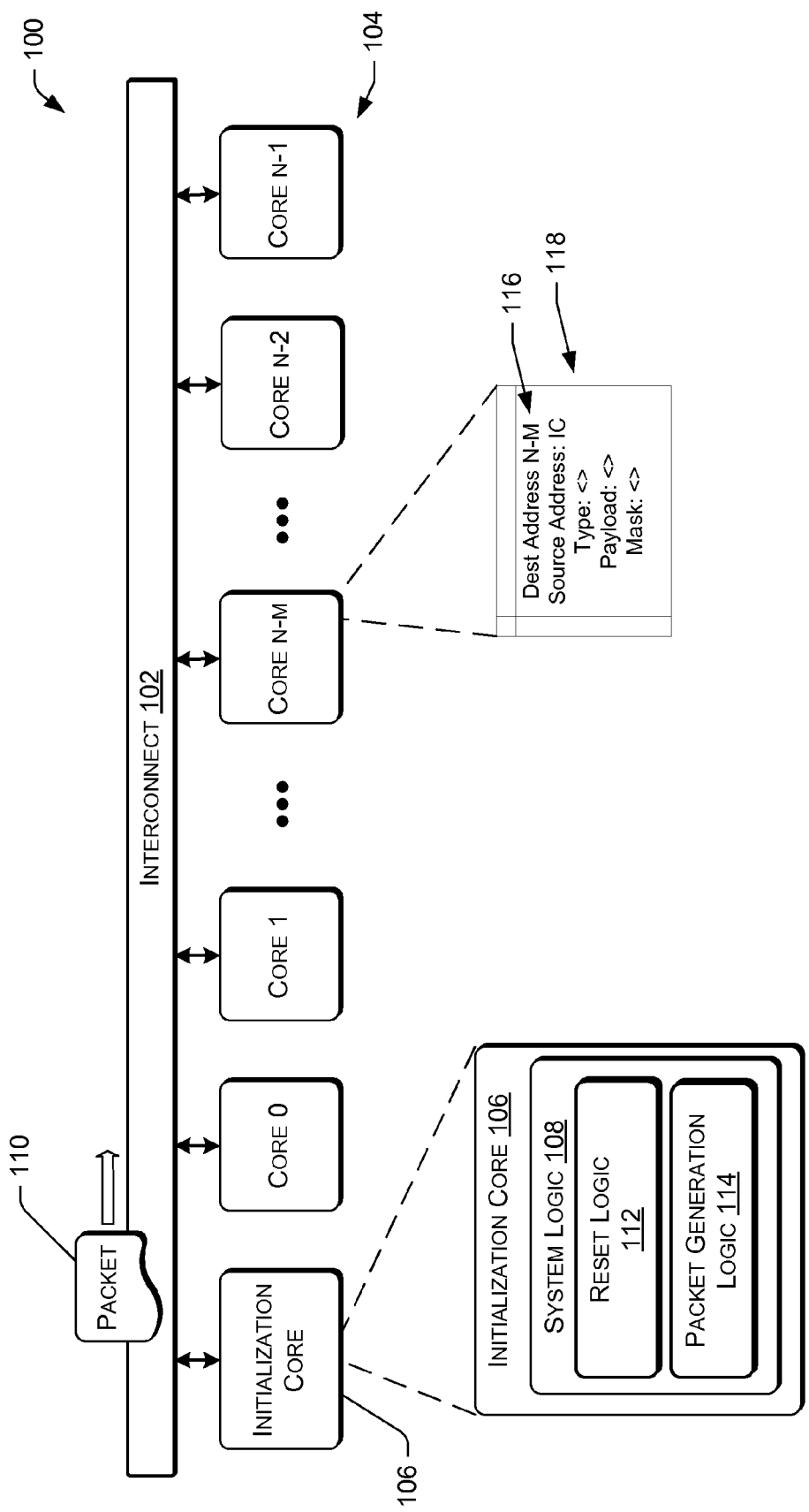
FIG. 1 is a schematic diagram of an illustrative multi-core processing unit that uses an interconnect to facilitate communication between the cores.

FIG. 1 is a schematic diagram of an illustrative multi-core processing unit 100 that uses an interconnect 102 to facilitate communication between the cores. In various embodiments, the multi-core processing unit 100 (or processor) may include a plurality of cores 104, which may be central processing units (CPUs), graphical processing units (GPUs), general processing graphical processing units (GPGPUs), other processing logic, or a combination thereof.

Figure 2:
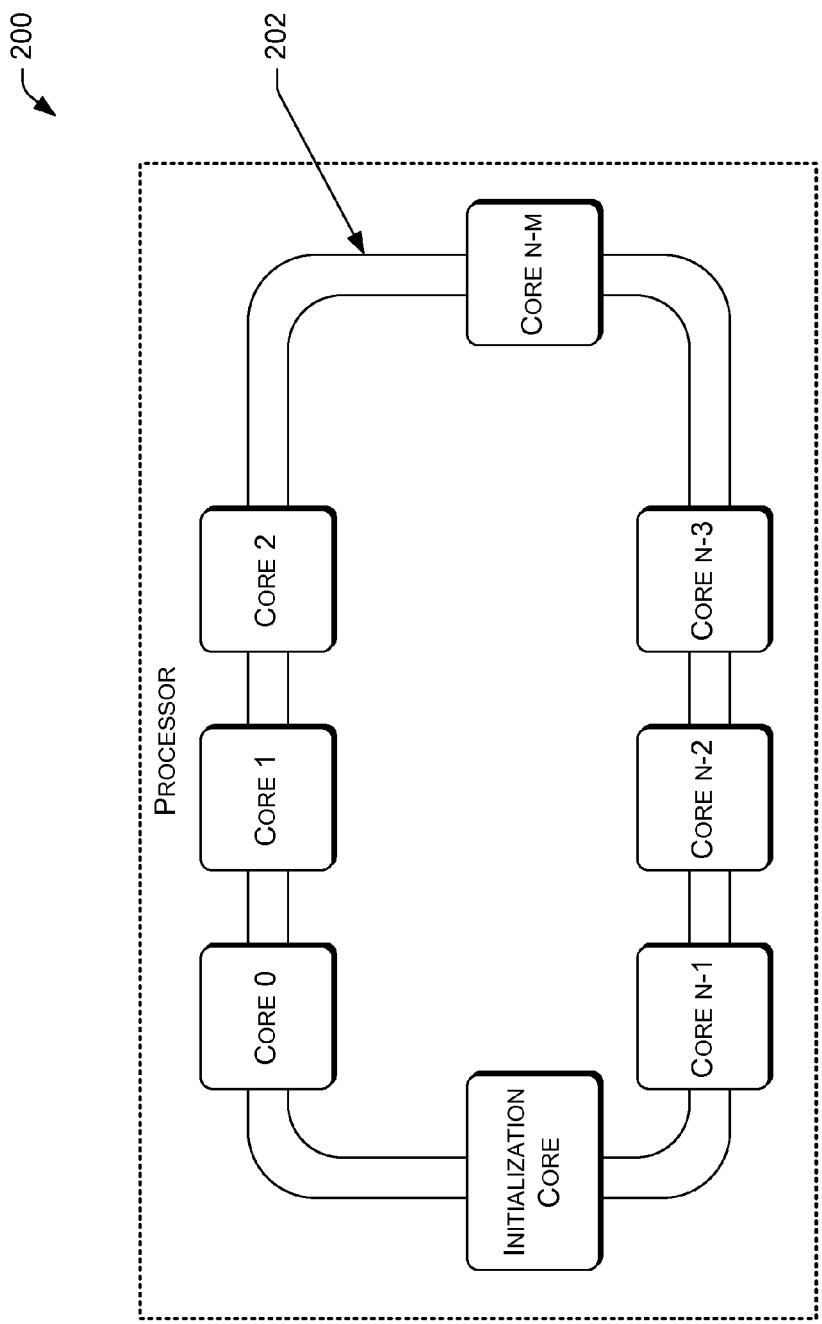
FIG. 2 is a schematic diagram of an illustrative multi-core processing unit that uses an interconnect arranged as a ring structure.
Figure 3:
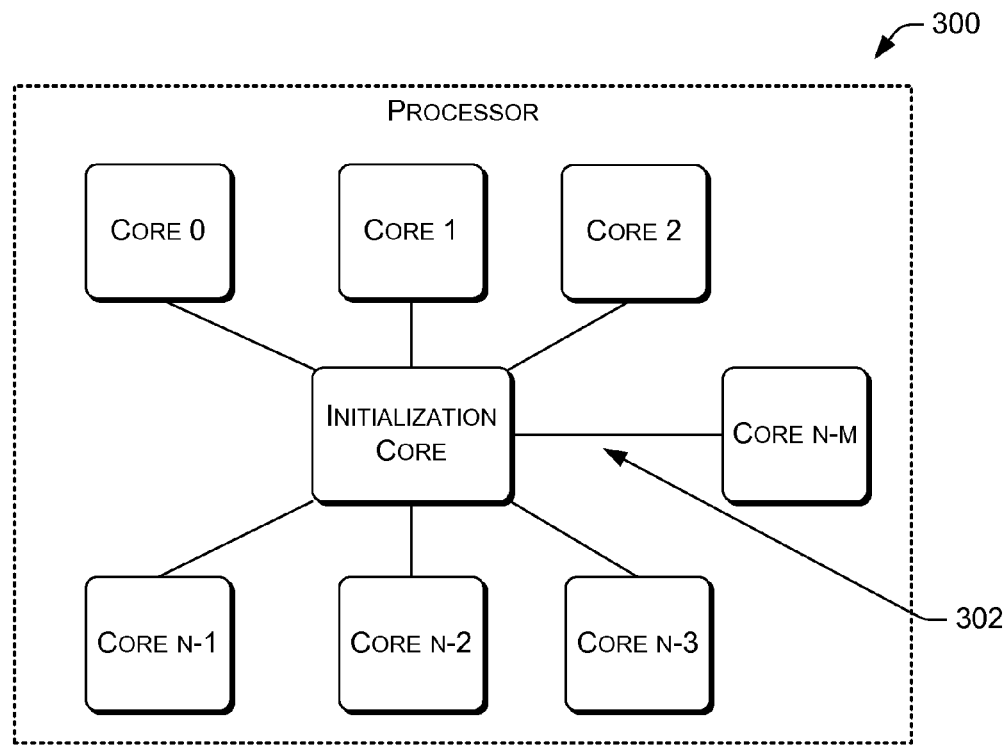
FIG. 3 is a schematic diagram of an illustrative multi-core processing unit that uses an interconnect arranged as a mesh.
Figure 4:
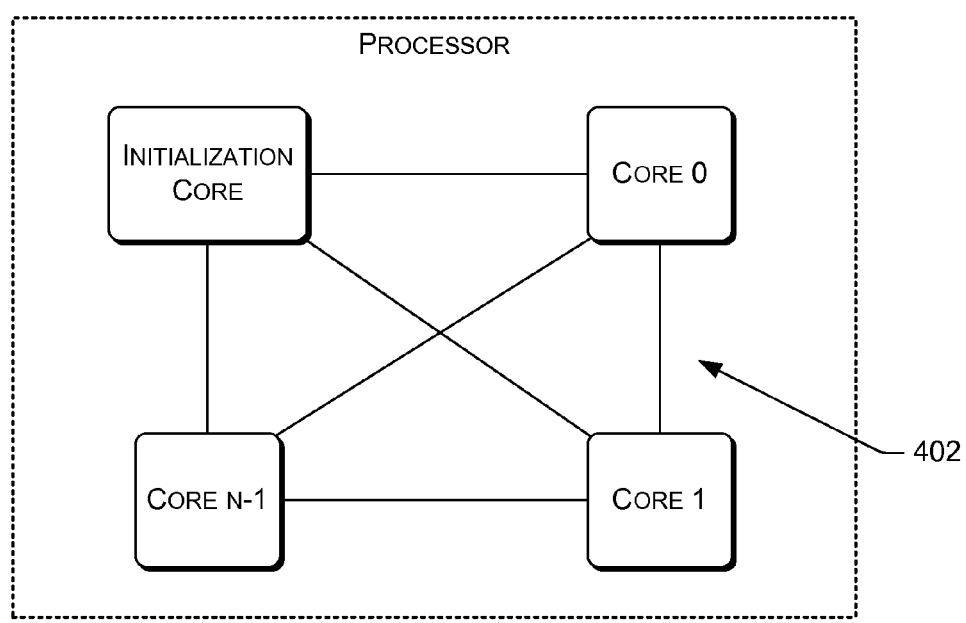
FIG. 4 is a schematic diagram of an illustrative multi-core processing unit that uses an interconnect arranged in a peer-to-peer configuration.

In accordance with the some embodiments, the various cores may be in communication with each other and/or an initialization core 106 via the interconnect 102. In accordance with various embodiments, the interconnect 102 may be arranged as a shared interconnect as shown in FIG. 1, as a ring interconnect as shown in FIG. 2, as a mesh interconnect as shown in FIG. 3, or as a peer-to-peer (P2P) interconnect as shown in FIG. 4.

The cores may operate in parallel, and during operation, transmit requests to each other to exchange data. Thus, a first core may be reliant on processing by a second core before the first core can complete a processing operation. In some instances, the second core may become unresponsive and need to be reset prior to fulfilling the request to the first core.

The initialization core 106 may be a processing core that includes system logic 108. The system logic 108 may be used to transmit reset information (and possibly unreset information) to one or more of the plurality of cores through use of a packet 110. In some embodiments, the reset information may be used to power-off a core while the unreset information may be used to power-on the core. However, in some embodiments, the reset information by used to power-off and then power-on the core. The system logic 108 may include reset logic 112 and packet generation logic 114. The reset logic may determine how to execute the reset and/or unreset of the cores. For example, the reset logic 112 may initiate a protocol that stops a transmission of requests from other cores to a problematic core. The reset logic 112 may then reset and then possibly unreset the problematic core while enabling continued operation of at least one other core of the multi-core processor.

In accordance with various embodiments, the packet generation logic 114 may create packets that may include notification packets, reset packets, unreset packets, and possibly other types of packets. The packets may communicate instructions, commands, and/or information to the various cores of the multi-core processing unit. For example, the packet generation logic 114 may create a packet for each of the cores to communicate to the cores to stop transmitting requests to the problematic core until the core has been reset. The packet generation logic 114 may then create a packet that instructs the problematic core to reset. In some instances, the packet generation logic 114 may create another packet that communicates to the previously problematic core to perform an unreset and power-on. The packet generation logic 114 may also transmit packets to the other cores to notify the other cores when the previously problematic core is able to begin to receive requests from the other cores following the reset.

The packet 110 may include an address of a recipient core, such as the core n-m or another core. In some embodiments, the packet may include multiple addresses of different cores, where the cores may have different information to be transmitted to the respective cores or the cores may have the same information to be transmitted to the respective cores. When the packet 110 is received by a core having a destination address 116 specified by the packet, the core may read at least a portion of the contents 118 of the packet that applies to the core. In some embodiments, a core may read a command (e.g., from a "type", "payload" or other part of the packet) from the packet. The core may then implement the command, such as by resetting (powering-off), unresetting (powering-on), or performing other tasks or functionality as described herein.

In accordance with some embodiments, the initialization core 106 may combine both a reset command and an unreset command into a single packet for a core. In these embodiments, the unreset command may be delayed a predetermined amount of time, thus causing the core to remain in a reset (powered off) state for the predetermined amount of time. In various embodiments, the reset command may not require an unreset command, and thus the cores may power-off and then power-on in response to receipt of a reset command from a packet.

FIG. 2 is a schematic diagram of an illustrative multi-core processing unit 200 that uses an interconnect arranged as a ring structure 202. The ring structure 202 may accommodate an exchange of the packet 110 between the initialization core and the other cores or between any combinations of the cores.

FIG. 3 is a schematic diagram of an illustrative multi-core processing unit 300 that uses an interconnect arranged as a mesh 302. The mesh 302 may accommodate an exchange of the packet 110 between the initialization core and the other cores or between any combinations of the cores.

FIG. 4 is a schematic diagram of an illustrative multi-core processing unit 400 that uses an interconnect arranged in a peer-to-peer configuration 402. The peer-to-peer configuration 402 may accommodate an exchange of the packet 110 between the initialization core and the other cores or between any combinations of the cores.

Illustrative Reset

Figure 5:
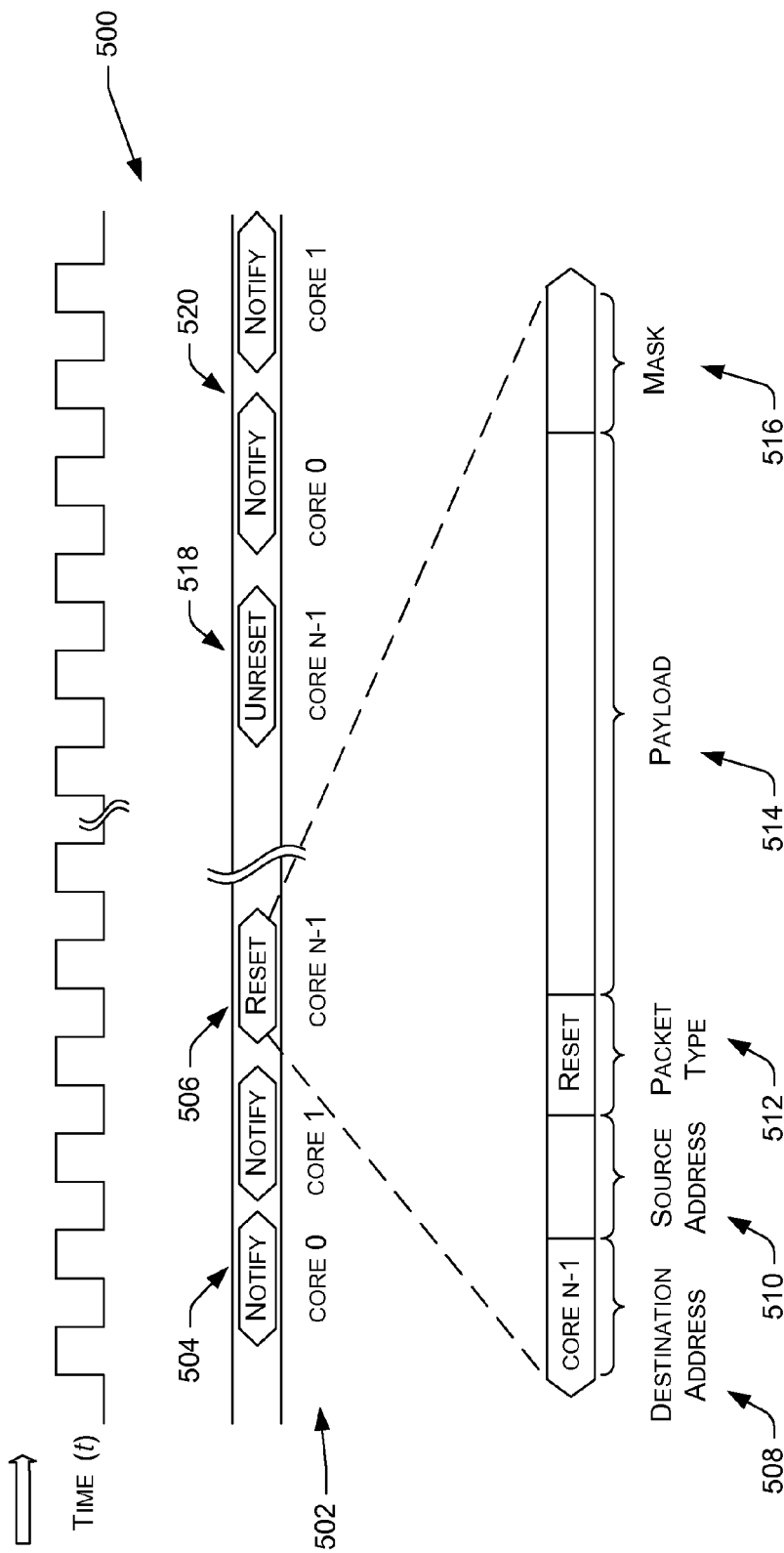
FIG. 5 is a schematic diagram showing illustrative packets that are transmitted to one or more cores to perform a reset.

FIG. 5 is a schematic diagram showing packets 500 that are transmitted over time (t) to various cores to perform a reset of one or more cores while continuing operation of at least one other core of the multi-core processor. The packets 500 may be generated by the packet generation logic 114 and transmitted to the various cores 502 in response to instructions from the reset logic 112. For example, the system logic 108 determine that core n-1 is to be reset because the core n-1 is unresponsive or otherwise not operating properly. The reset logic 112 may issue a request to the packet generation logic 114 to transmit notification packets 504 to at least a portion of the cores 502 that may be transmitting requests (or awaiting responses from) the problematic core n-1 at a particular time t. The notification packets 504 may request the cores to drop requests and/or stop transmitting requests to the problematic core n-1. The reset logic 112 may then issue a request to the packet generation logic 114 to transmit a reset packet 506 to the problematic core n-1.

An illustrative reset packet 506 shows example information that may be included in the packet. The packet may include a destination address 508 that indicates a core that the packet is to be delivered to, such as core n-1, etc. A source address 510 may indicate an address of a sender of the packet. A packet type 512 may indicate an operation for the core or provide general information to the core. For example, the packet type 512 may be "reset," "unreset," or another packet type. When the packet type 512 is reset, the core having the destination address may perform the reset. The packet may also include a payload 514 and mask 516. The payload 514 may include additional information or instructions for the core having the destination address. For example, the payload may instruct the core to stop transmitting requests to another core, such as the problematic core n-1, for a predetermined amount of time or until further notification is received.

The reset logic 112 may instruct the packet generation logic 114 to transmit an unreset packet 518 to the problematic core that has been reset, thereby causing the core to power-on. The reset logic 112 may then determine whether the core is operating properly following the reset/unreset operations. When the core is operating properly, then the reset logic 112 may instruct the packet generation logic 114 to transmit notification packets 520 to the other cores (possibly the same cores that received the notification packet 504), to notify these cores that the previously problematic core n-1 can now receive requests. While the problematic core n-1 is reset (and possibly unreset), the other cores (e.g., cores 0, 1, etc.) may continue to perform operations without being reset.

Figure 6:
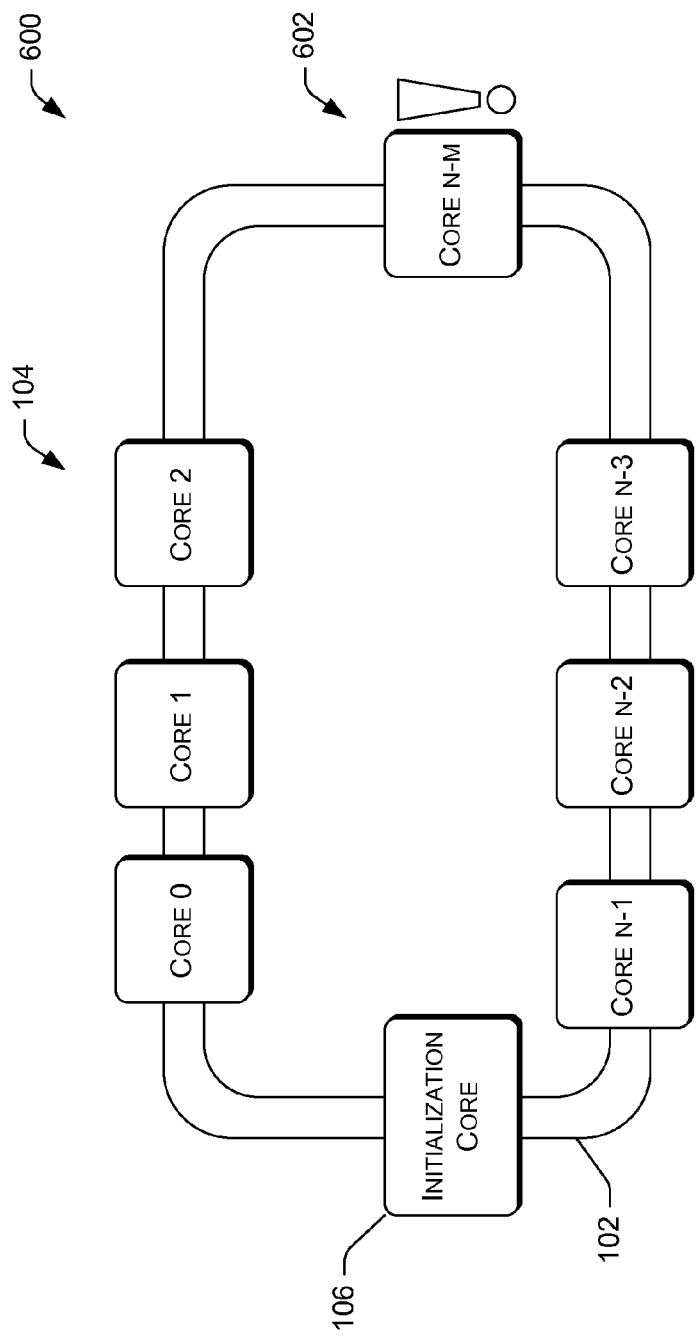
FIG. 6 is a schematic diagram of a multi-core processing unit where an initialization core detects a problematic core.

FIG. 6 is a schematic diagram of a multi-core processing unit 600 where the initialization core 106 detects a problematic core 602 as core n-m. The problematic core 602 may be unresponsive, non-operational, or otherwise not operating properly. In some embodiments, the problematic core may request a reset. The initialization core 106 may also determine that the problematic core is to be reset to remedy a problem with the core. In various embodiments, the system logic 108 may monitor the various cores to identify the problematic core that is not operating properly, such as by identifying cores that are not responsive to request from other cores, or based on other activities in inactivity of the cores, including but not limited to activities or inactivity of the problematic core 602. For example, the system logic 108 may detect that the problematic processing core has failed to respond to a pending request within a threshold amount of time, and therefore is problematic. The pending request may be a test request issued by the system logic to determine whether the problematic core is operating correctly. For example, the test request may be used to detect that problematic core is to be reset because the problematic core does not satisfy conditions of the test (e.g., no reply, incorrect reply, late reply, etc.)

Figure 7:
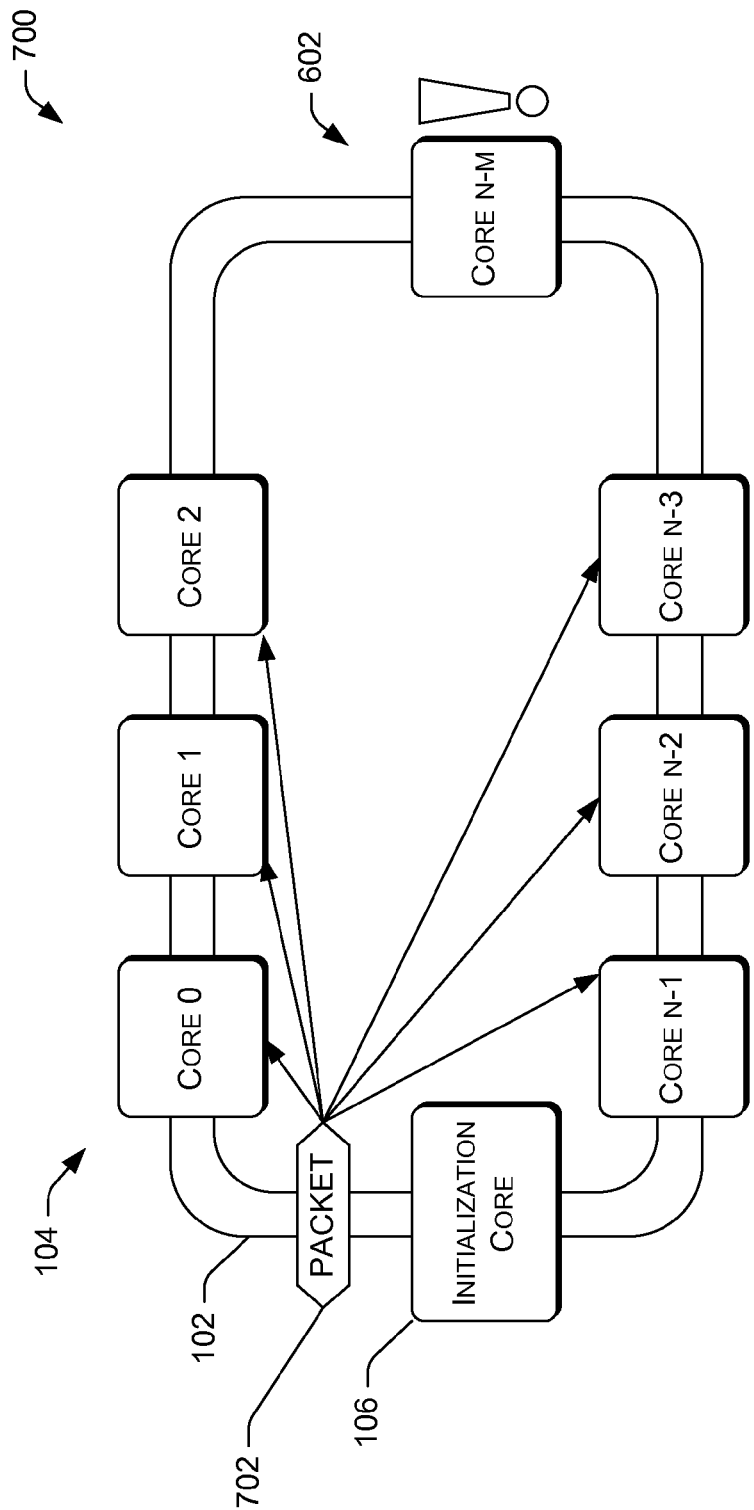
FIG. 7 is a schematic diagram of a multi-core processing unit where the initialization core issues a packet to notify other cores to stop transmitting requests to the problematic core.

FIG. 7 is a schematic diagram of a multi-core processing unit 700 where the initialization core 106 issues one or more packets 702 to notify other cores to stop transmitting requests to the problematic core 602. In some embodiments, the packets 702 may be transmitted to cores that are or have transmitted request to the problematic core 602. However, the packets 702 may also be transmitted to all the cores to instruct the cores to stop transmitting request to the problematic core 602 and/or drop any pending requests of the problematic core.

Figure 8:
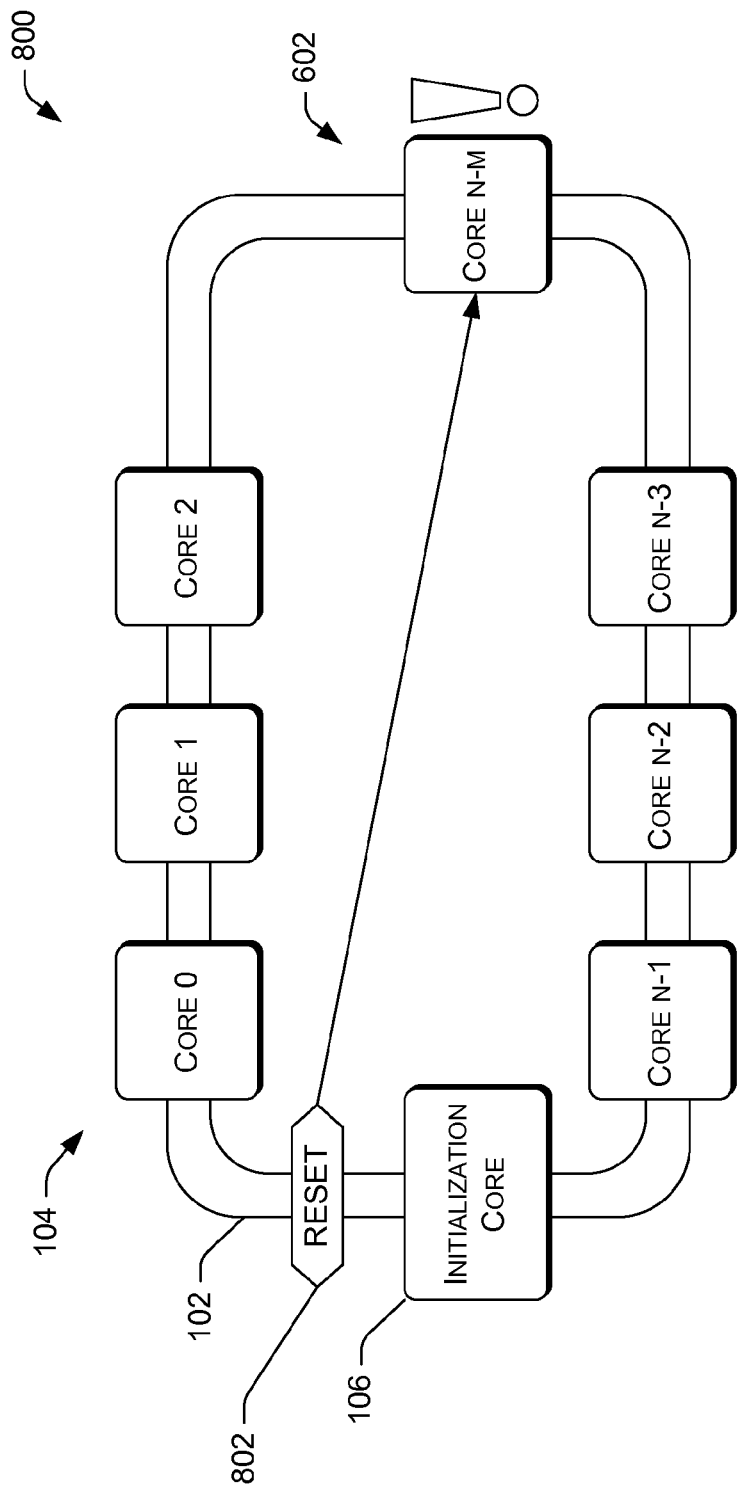
FIG. 8 is a schematic diagram of a multi-core processing unit where the initialization core resets the problematic core while operating at least one other core.

FIG. 8 is a schematic diagram of a multi-core processing unit 802 where the initialization core 106 resets the problematic core 602 while operating at least one other core. The reset logic 112 may instruct the packet generation logic 114 to transmit a reset packet 802 to the problematic core 602 to initiate a reset of the problematic core. In some instances the reset logic 112 may also instruct the packet generation logic 114 to transmit an unreset packet to the problematic core to power-on the problematic core, which may no longer be problematic, but instead may have returned to normal operation following the reset. At least one other core of the plurality of cores 104 may continue processing instructions during normal operation while the problematic core 602 is reset. Thus, the problematic core may be reset without resetting all the other cores in the multi-core system.

Illustrative Operation

Figure 9:
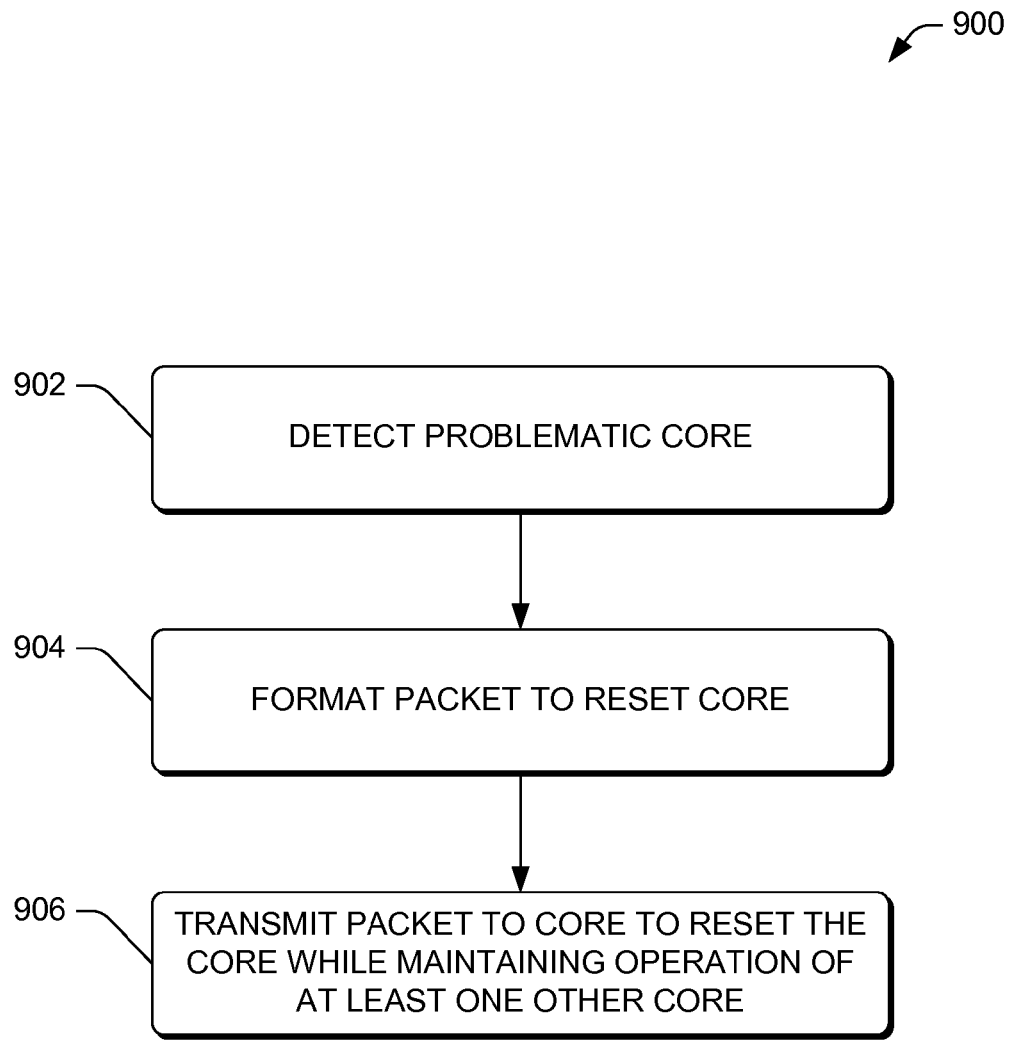
FIG. 9 is a flow diagram of an illustrative process to perform a reset of a portion of cores of a multi-core processing unit.
Figure 10:
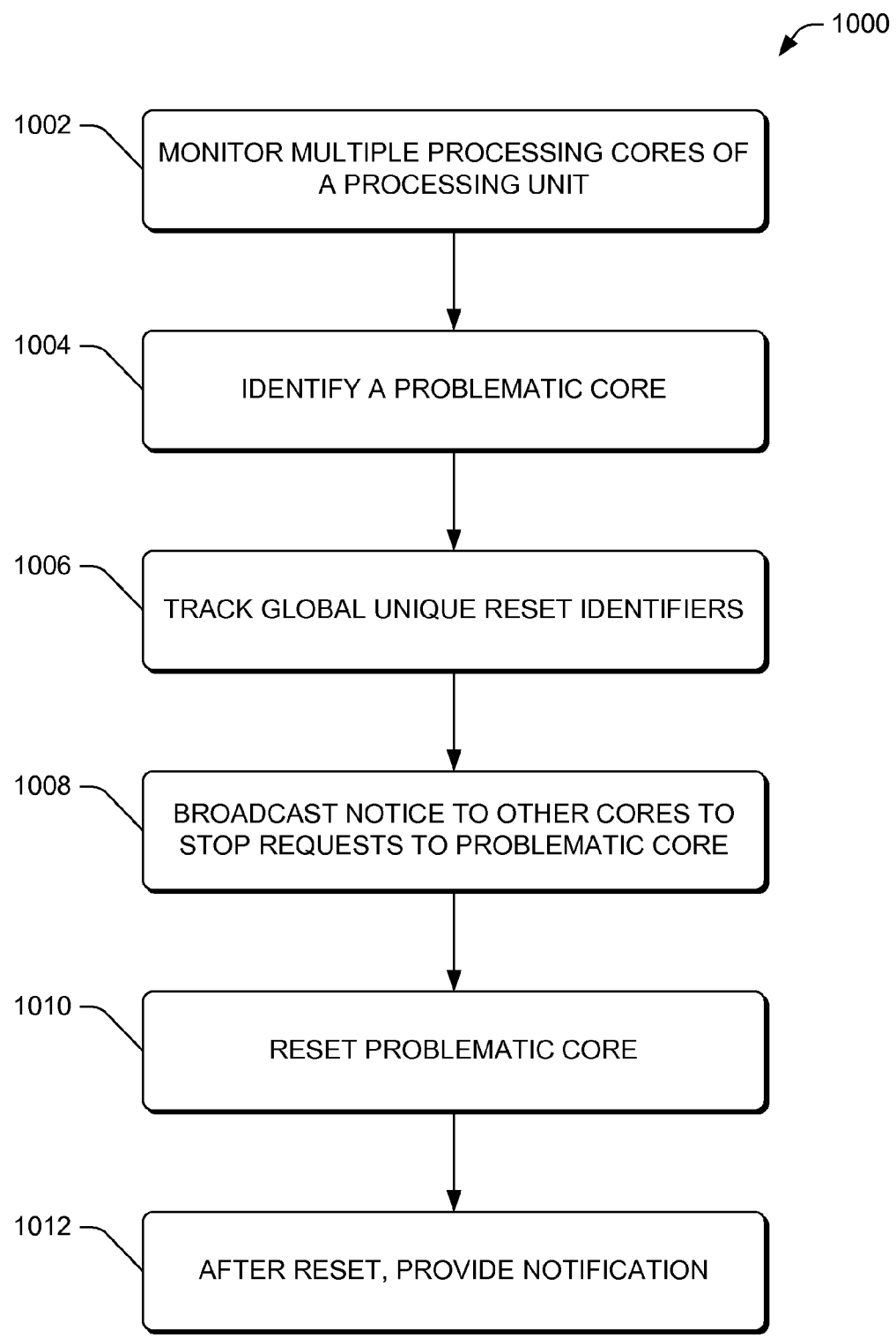
FIG. 10 is a flow diagram of another illustrative process to perform a reset of a portion of cores of a multi-core processing unit.
Figure 11:
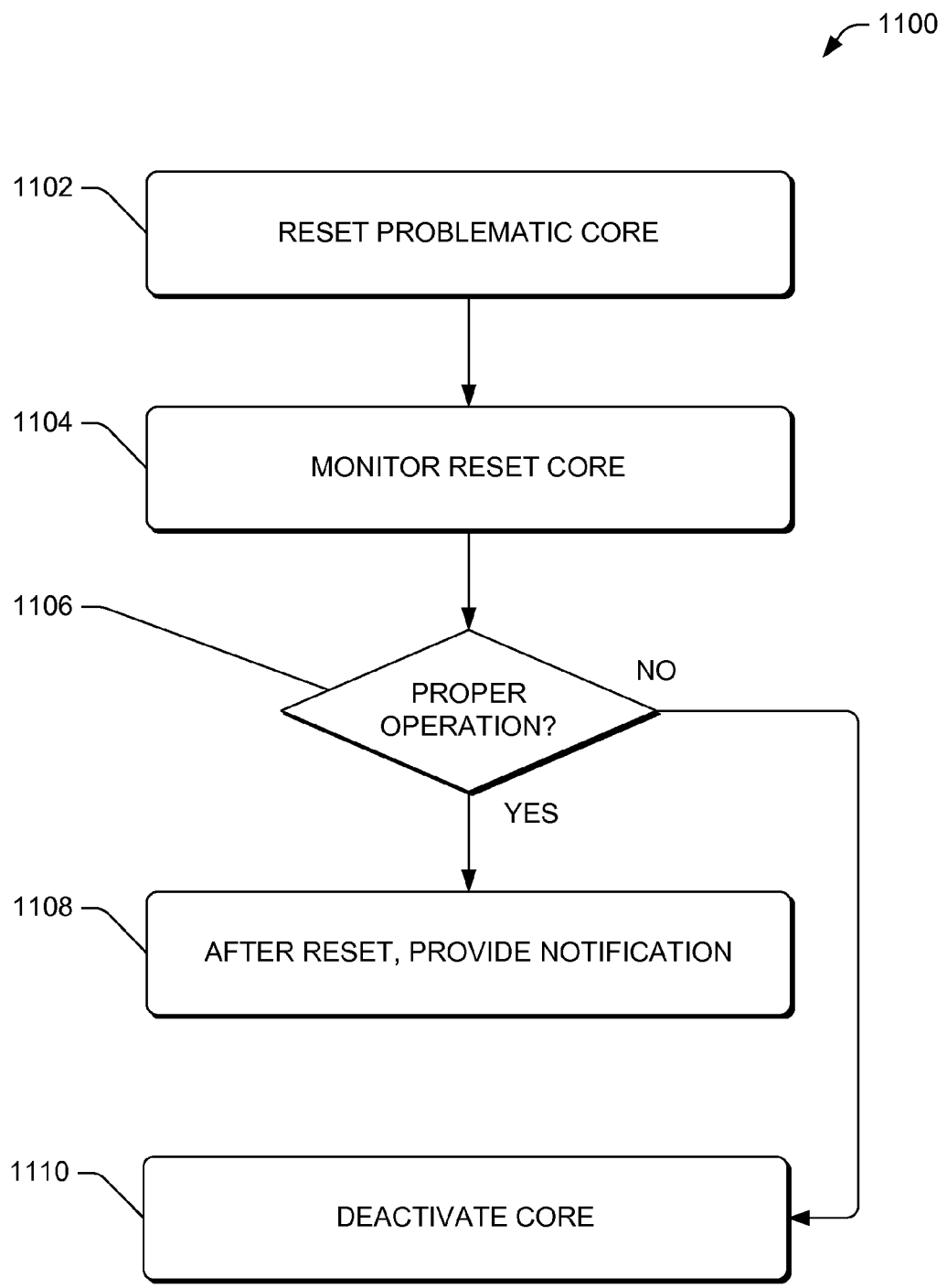
FIG. 11 is a flow diagram of an illustrative process to detect whether the problematic core operates properly after the reset.

FIGS. 9-11 show illustrative processes to perform a reset of a portion of cores while continuing operation of at least one other core of a multi-core processor. The processes are illustrated as a collection of blocks in a logical flow graph, which represent a sequence of operations that can be implemented in hardware, software, or a combination thereof. The order in which the operations are described is not intended to be construed as a limitation, and any number of the described blocks can be combined in any order and/or in parallel to implement the processes. The processes are described with reference to the previously described environments. Of course, the processes may be performed in other similar and/or different environments.

FIG. 9 is a flow diagram of an illustrative process 900 to perform a reset of a portion of cores of a multi-core processing unit while continuing processing by at least one core of the multi-core processing unit.

At 902, the initialization core 106, via the system logic 108, may detect a problematic core. For example, the system logic 108 may monitor activity and/or inactivity of the cores 104 to determine when a core is a problematic core that is to be reset.

At 904, the reset logic 112 may instruct the packet generation logic 114 to format a packet to reset the problematic core. For example, the packet generation logic 114 may generate a single packet for the problematic core that initiates the reset process to that core without resetting other cores.

At 906, the packet generation logic 114 may transmit the reset packet to the problematic core while at least one other core of the multi-core processor maintains operation and continues to process instructions without also being reset.

FIG. 10 is a flow diagram of another illustrative process 1000 to perform a reset of a portion of cores of a multi-core processing unit.

At 1002, the system logic 108 may monitor multiple processing cores of the processing unit to determine whether the cores are operating properly (e.g., responding to requests in a timely manner, reporting error codes, dropping data or messages, etc.).

At 1004, the system logic 108 may identify a problematic core. For example, the problematic core 602 may be identified by detecting that the core is not responding to requests from other cores or from the system logic 108.

At 1006, the system logic 108 may track global unique reset identifiers of the cores to determine which cores are interacting with the problematic core. For example, the system logic 108 may detect that a portion of the cores of the multi-core processor are awaiting information from the problematic core.

At 1008, the reset logic 112 and the packet generation logic 114 may generate and transmit notices (using packets) to the other cores to stop requests to the problematic core and/or drop current requests. Thus, a notification packet may essentially cut off and/or terminate communications between the other cores and the problematic core, at least temporarily.

At 1010, the reset logic 112 and the packet generation logic 114 may generate and transmit a reset packet for the problematic core to reset the problematic core without resetting at least one other core. In some embodiments, the reset logic 112 and the packet generation logic 114 may also generate and transmit an unreset packet to the problematic core to power-on the core. However, the reset core may return to power without the unreset packet in some implementations.

At 1012, the reset logic 112 and the packet generation logic 114 may generate and transmit notification packets for at least some of the cores to indicate that the previously problematic core has been reset and is now available to receive request. For example, the notification packets may be delivered to the same cores that received the notification at the operation 1008.

FIG. 11 is a flow diagram of an illustrative process 1100 to detect whether the problematic core operates properly after the reset.

At 1102, the reset logic 112 and the packet generation logic 114 may reset the problematic core as described above.

At 1104, the reset logic 112 may monitor the reset logic to detect whether the previously problematic core has returned to normal operation. For example, the reset logic 112 may transmit a request (e.g., a test) to the core to determine whether the core can properly respond to the request and thus is operating properly.

At 1106, the reset logic 112 may detect whether the previously problematic core has returned to normal operation based at least in part on the monitoring. When the previously problematic core is operating properly (following the "yes" route from the decision operation 1106), at 1108, the reset logic 112 and the packet generation logic 114 may provide a notification to at least some of the other cores as discussed above with respect to the operation 1012.

When the core is still problematic and not operating properly (following the "no" route from the decision operation 1106, at 1110, the core may be deactivated or otherwise retired due to a malfunction of the core. The core may be serviced to restore operation or may be permanently deactivated and have any operations reallocated to other cores. Unlike a rack system, the multi-core processor may be formed of a single piece of silicon, which may make it difficult and/or impractical to replace a malfunctioning core. Thus, the core may be permanently deactivated in some embodiments when the problematic core does not return to normal operation after one or more resets as described herein.

Illustrative System

Figure 12:
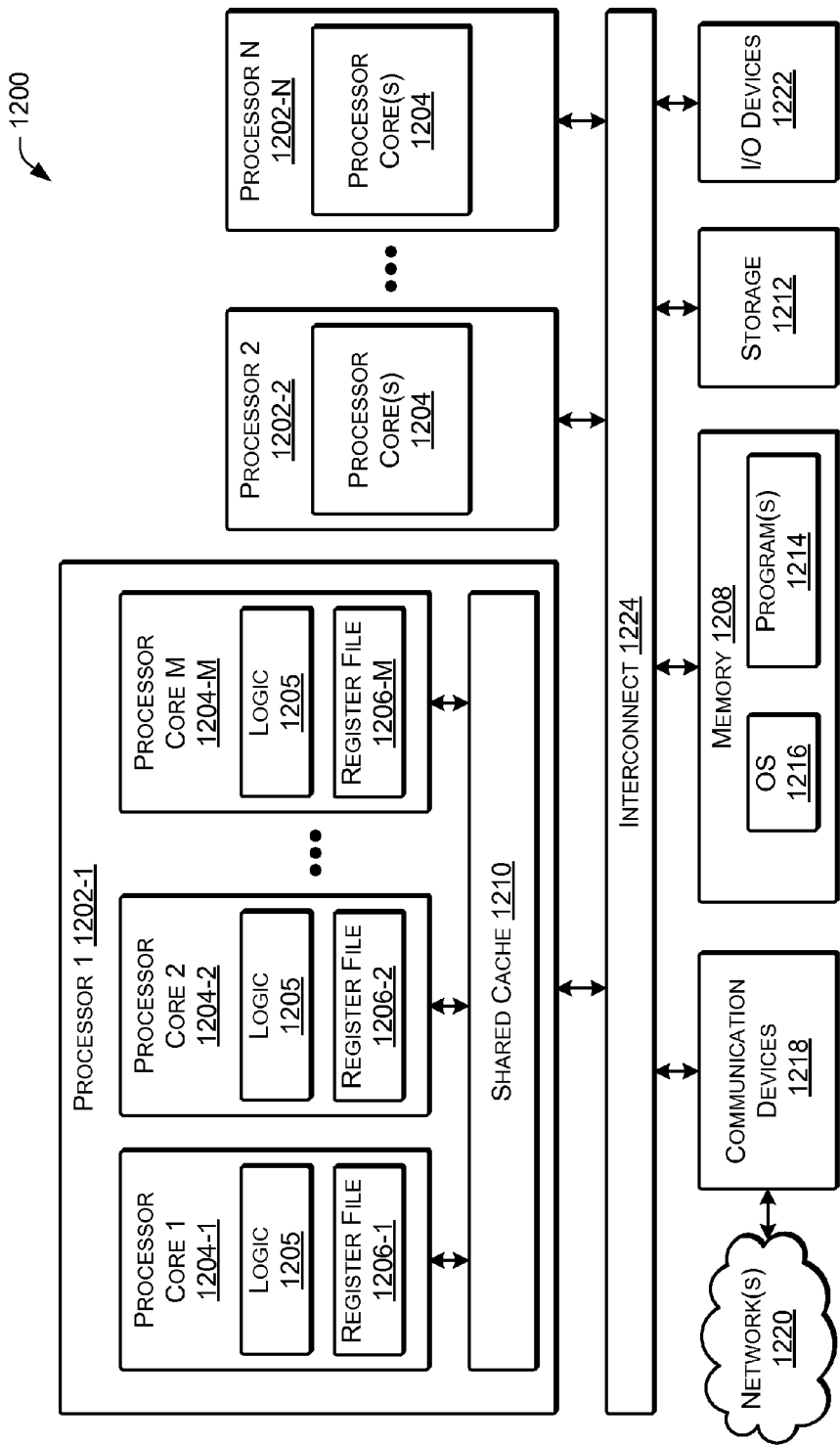
FIG. 12 is a block diagram of an illustrative system to a processor core when operating at least one other processor core in a multi-core processor.

FIG. 12 illustrates nonlimiting select components of an illustrative system 1200 according to some implementations herein that may include one or more instances of the processor architecture discussed above for implementing reset of a portion of cores in a multi-core processor. The system 1200 may include one or more processors 1202-1, 1202-2, . . . , 1202-N (where N is a positive integer ≥1), each of which may include one or more processor cores 1204-1, 1204-2, . . . , 1204-M (where M is a positive integer ≥1). In some implementations, as discussed above, the processor(s) 1202 may be a single core processor, while in other implementations, the processor(s) 1202 may have a large number of processor cores, each of which may include some or all of the components illustrated in FIG. 12. For example, each processor core 1204-1, 1204-2, . . . , 1204-M may include an instance of logic 1205 to perform various tasks for that respective processor core 1204-1, 1204-2, . . . , 1204-M. The logic 1205 may include one or more of dedicated circuits, logic units, microcode, or the like.

The processor(s) 1202 and processor core(s) 1204 can be operated to fetch and execute computer-readable instructions stored in a memory 1208 or other computer-readable media. The memory 1208 may include volatile and nonvolatile memory and/or removable and non-removable media implemented in any type of technology for storage of information, such as computer-readable instructions, data structures, program modules or other data. Such memory may include, but is not limited to, RAM, ROM, EEPROM, flash memory or other memory technology. In the case in which there are multiple processor cores 1204, in some implementations, the multiple processor cores 1204 may share a shared cache 1210. Additionally, storage 1212 may be provided for storing data, code, programs, logs, and the like. The storage 1212 may include solid state storage, magnetic disk storage, RAID storage systems, storage arrays, network attached storage, storage area networks, cloud storage, CD-ROM, digital versatile disks (DVD) or other optical storage, magnetic cassettes, magnetic tape, or any other medium which can be used to store desired information and which can be accessed by a computing device. Depending on the configuration of the system 1200, the memory 1208 and/or the storage 1212 may be a type of computer readable storage media and may be a non-transitory media.

The memory 1208 may store functional components that are executable by the processor(s) 1202. In some implementations, these functional components comprise instructions or programs 1214 that are executable by the processor(s) 1202. The example functional components illustrated in FIG. 12 further include an operating system (OS) 1216 to mange operation of the system 1200.

The system 1200 may include one or more communication devices 1218 that may include one or more interfaces and hardware components for enabling communication with various other devices over a communication link, such as one or more networks 1220. For example, communication devices 1218 may facilitate communication through one or more of the Internet, cable networks, cellular networks, wireless networks (e.g., Wi-Fi, cellular) and wired networks. Components used for communication can depend at least in part upon the type of network and/or environment selected. Protocols and components for communicating via such networks are well known and will not be discussed herein in detail.

The system 1200 may further be equipped with various input/output (I/O) devices 1222. Such I/O devices 1222 may include a display, various user interface controls (e.g., buttons, joystick, keyboard, touch screen, etc.), audio speakers, connection ports and so forth. An interconnect 1224, which may include a system bus, point-to-point interfaces, a chipset, or other suitable connections and components, may be provided to enable communication between the processors 1202, the memory 1208, the storage 1212, the communication devices 1218, and the I/O devices 1222.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A processor comprising:
   a plurality of processing cores;
   an interconnect coupled to the plurality of processing cores; and
   a first logic to detect a non-responding processing core from the plurality of processing cores and to transmit reset information to the non-responding processing core on the interconnect, wherein the reset information is to be formatted into a packet, wherein the reset information includes a reset operation to power-off the non-responsive processing core and unreset information to power-on the non-responsive processing core.

2. The processor as recited in claim 1, further comprising a second logic to maintain processing of at least one other processing core of the plurality of processing cores while the first logic detects and transmits the reset information to the non-responding processing core to reset the non-responding processing core.

3. The processor as recited in claim 1, further comprising a second logic to transmit a notification message to at least one other processing core of the plurality of processing cores, the notification message to instruct the at least one other processing core to stop transmitting requests to the non-responding processing core until the non-responding processing core is reset.

4. The processor as recited in claim 3, wherein the second logic transmits a second notification message to the at least one other processing core to indicate that the at least one other processing core is to resume transmitting the requests.

5. The processor as recited in claim 1, wherein a first logic detects the non-responding processing core by detecting that the non-responsive processing core has failed to respond to a pending request within a threshold amount of time.

6. The processor as recited in claim 1, wherein the interconnect is arranged as a ring structure.

7. A method comprising:
formatting a packet to include reset information; and
transmitting the packet over an interconnect to a particular processing core from among a plurality of processing cores, wherein the reset information includes information to at least power-off the particular processing core without powering-off all the plurality of processing cores.

8. The method as recited in claim 7, further comprising processing instructions by at least one other processing core of the plurality of processing cores while performing the transmitting to reset the particular processing core.

9. The method as recited in claim 7, further comprising transmitting a notification message to at least one other processing core of the plurality of processing cores, the notification message to instruct the at least one other processing core to drop requests to the particular processing core at least until the particular processing core is reset.

10. The method as recited in claim 9, further comprising transmitting a second notification message to the at least one other processing core to indicate that the at least one other processing core is to resume transmitting the requests to the particular processing core.

11. The method as recited in claim 7, wherein the particular processing core is to be reset following an indication that the particular processing core is unresponsive to at least one request for the particular processing core.

12. The method as recited in claim 7, wherein the interconnect is arranged as a ring structure to facilitate the transmitting of the packet.

13. A method comprising:
detecting a non-responding processing core from a plurality of processing cores by transmitting a test request to the non-responding processing core and detecting the non-responding core is to be reset when the non-responding core does not satisfy conditions of the test;
sending a notice over an interconnect to remaining processing cores in the plurality of processing cores to instruct the remaining processing cores to cease requests of the non-responding processing core; and
transmitting a reset information over the interconnect to the non-responding processing core, wherein the reset information is to be formatted into a packet.

14. The method as recited in claim 13, further comprising processing instructions by at least some of the remaining processing cores while performing the transmitting the reset information to the non-responding processing core.

15. The method as recited in claim 13, wherein the notice is formatted into one or more packets for transmission to each of the remaining processing cores.

16. The method as recited in claim 13, wherein the packet is transmitted from an initialization core to the non-responding core via the interconnect.

17. The method as recited in claim 13, further comprising monitoring the non-responsive processing core following the transmitting to ensure that the non-responsive core returns to normal operation.

* * * * *